(12) United States Patent
Volpe et al.

(10) Patent No.: US 10,049,078 B1
(45) Date of Patent: Aug. 14, 2018

(54) ACCESSING A MEMORY LOCATION USING A TWO-STAGE HASH SCHEME

(71) Applicant: Amazon Technologies, Inc., Seattle, WA (US)

(72) Inventors: Thomas A. Volpe, Austin, TX (US); Kari Ann O'Brien, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 207 days.

(21) Appl. No.: 14/750,015

(22) Filed: Jun. 25, 2015

(51) Int. Cl.
*G06F 15/16* (2006.01)
*G06F 15/167* (2006.01)
*G06F 12/06* (2006.01)
*H04L 29/08* (2006.01)

(52) U.S. Cl.
CPC ............ *G06F 15/167* (2013.01); *G06F 12/06* (2013.01); *H04L 67/142* (2013.01); *G06F 2212/254* (2013.01)

(58) Field of Classification Search
None
See application file for complete search history.

(56) References Cited

U.S. PATENT DOCUMENTS

| | | | |
|---|---|---|---|
| 2002/0065924 A1* | 5/2002 | Barrall | H04L 29/06 709/227 |
| 2003/0154399 A1* | 8/2003 | Zuk | H04L 63/0254 726/11 |
| 2008/0183970 A1* | 7/2008 | Ros | G06F 12/084 711/141 |

OTHER PUBLICATIONS

Sullivan, David G. "Hash Tables" Computer Science E-199 Harvard Extension School. Fall 2012.*
Gilreath, William. Hash Sort: A Linear Time Complexity Mulitiple-Dimensional Sort Algorithm Originally Entitled "Making a Hash of Sorts". Aug. 17, 2004.*

* cited by examiner

*Primary Examiner* — Scott B Christensen
(74) *Attorney, Agent, or Firm* — Klarquist Sparkman, LLP

(57) ABSTRACT

A method for accessing a memory location may include receiving packet data associated with a network connection. A first hash value and a second hash value are generated using the packet data. The first hash value identifies a hash bucket with a plurality of connection state entries. An index entry of the hash bucket is accessed using the first hash value. The index entry includes a plurality of hash keys for the corresponding plurality of connection state entries. The second hash value is matched with one of the plurality of hash keys in the index entry to obtain an offset. One of the plurality of connection state entries for the network connection is identified based on the first hash value and the offset. The identified connection state entry is accessed.

20 Claims, 8 Drawing Sheets

ACCESSING A MEMORY LOCATION USING A TWO-STAGE HASH SCHEME

BACKGROUND

Software packages and hardware implementations are available to manage network connections, such as offering options for packet filtering, network address translation, and port translation. Such functions direct packets through a network and provide an ability to prohibit packets from being delivered to unauthorized locations.

Such software packages and hardware implementations can also provide packet (network connection) tracking ability. For example, packet (network connection) state information can be tracked in order to analyze if a next received packet complies with the state of a network connection. If not, the packet can be dropped. Otherwise, the packet can be forwarded. Packet tracking can also include having timers that timeout if a packet has not been received for more than a predetermined period of time. With potentially millions of connections being tracked, monitoring connection state information for a large number of packets (or connections) can be difficult and requires extensive system resources, which can result in slowing packet throughput.

DETAILED DESCRIPTION

Figure 1:
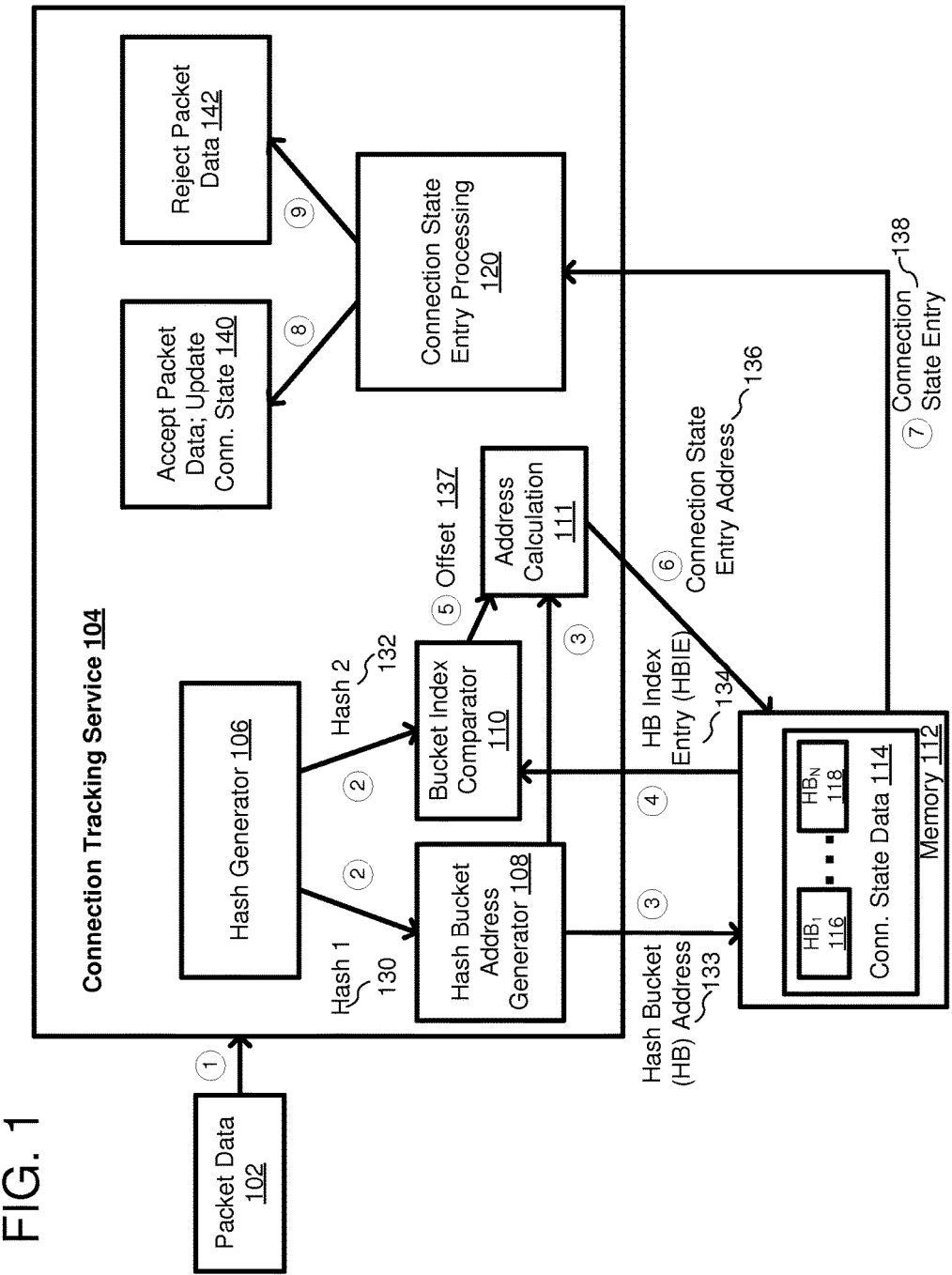
FIG. 1 shows an example two-stage connection tracking service, in accordance with an example embodiment of the disclosure.

The technologies described herein include a two-stage hash scheme for accessing a memory location (e.g., to validate a connection state for an incoming packet). In different network-based environments, a service provider can receive millions of packets each second on millions of different network connections. The technologies described herein can be used for state tracking of logical network connections. For example, state can be tracked for each individual connection between two devices on a network, such as a server computer and a client computer. State tracking allows filtering of malicious spoofed packets that are correctly constructed, but not legal in a sequence of packets already in progress on that connection. In a particular implementation, the system can track ingress and egress packet headers and their associated state on a per-connection basis. Typically, a main memory is used to support state tracking operations by storing one entry per connection. The entries can be modified every time a valid packet is processed by the system. The connections (i.e., sessions) can be identified using header information, such as a source address, a destination address, a source port, a destination port, and a protocol type (e.g., TCP).

In a particular implementation of the two-stage hash scheme, incoming packet data (which includes a source address, a destination address, a source port, a destination port, and a protocol type) is used by a hash generator to generate two different hash values. The two hash values are used for two sequential look-ups—the first hash is used to lookup an index of a hash bucket, and the second hash is used to lookup a connection state entry in the hash bucket. More specifically, the first hash value can be used to access a hash bucket and an index entry within the bucket. The index entry may include hash keys of connection state entries within the hash bucket. After the hash bucket index entry is accessed using the first hash, the second hash is compared with the hash keys until a matching hash key is found. The matching hash key in the index is used to obtain a corresponding offset, which is associated with a specific connection state entry in the bucket. The offset can then be used to access the bucket and obtain the connection state entry associated with the incoming packet data. The connection state entry is used to validate the packet and accept or reject it based on the validation result.

Various embodiments of the disclosed technologies can be implemented using different types of hardware. In some cases, the hardware comprises an I/O adapter device, which may be any device that inputs and/or outputs data along a communication channel. In one aspect, the I/O adapter device can facilitate communication between various physical and/or emulated components. The I/O adapter device can include embedded microprocessors to allow the device to execute software instructions. The I/O adapter device can also comprise other types of hardware logic. In some embodiments, the I/O adapter device is attached to, or integrated into, a host device, such as a server computer. Possible examples of I/O devices can include network interface cards (NICs), offload engines, or other devices.

FIG. 1 shows an example two-stage connection tracking service, in accordance with an example embodiment of the disclosure. Referring to FIG. 1, the connection tracking service (CTS) 104 may comprise suitable circuitry, interfaces, logic and/or code and may be operable to implement a two-stage hashing scheme to access connection state data (e.g., 114) stored in memory (e.g., 112). More specifically, the CTS 104 may comprise a hash generator 106, a hash bucket address generator module 108, a bucket index comparator 110, an address calculation module 111, and connection state entry processing module 120. The memory 112 may be internal memory for the CTS 104 or may be implemented outside the CTS 104 (e.g., as DDR or another type of memory).

The hash generator 106 may comprise suitable circuitry, interfaces, logic and/or code and may be operable to receive packet data 102, and generate two separate hash values 130-132. More specifically, the packet data 102 can include a plurality of fields (e.g., a source address, a destination address, a source port, a destination port, and a protocol type) that uniquely identify the packet's connection. In some instances, the packet data 102 can include a customer ID (which can include information identifying a customer).

Figure 3:
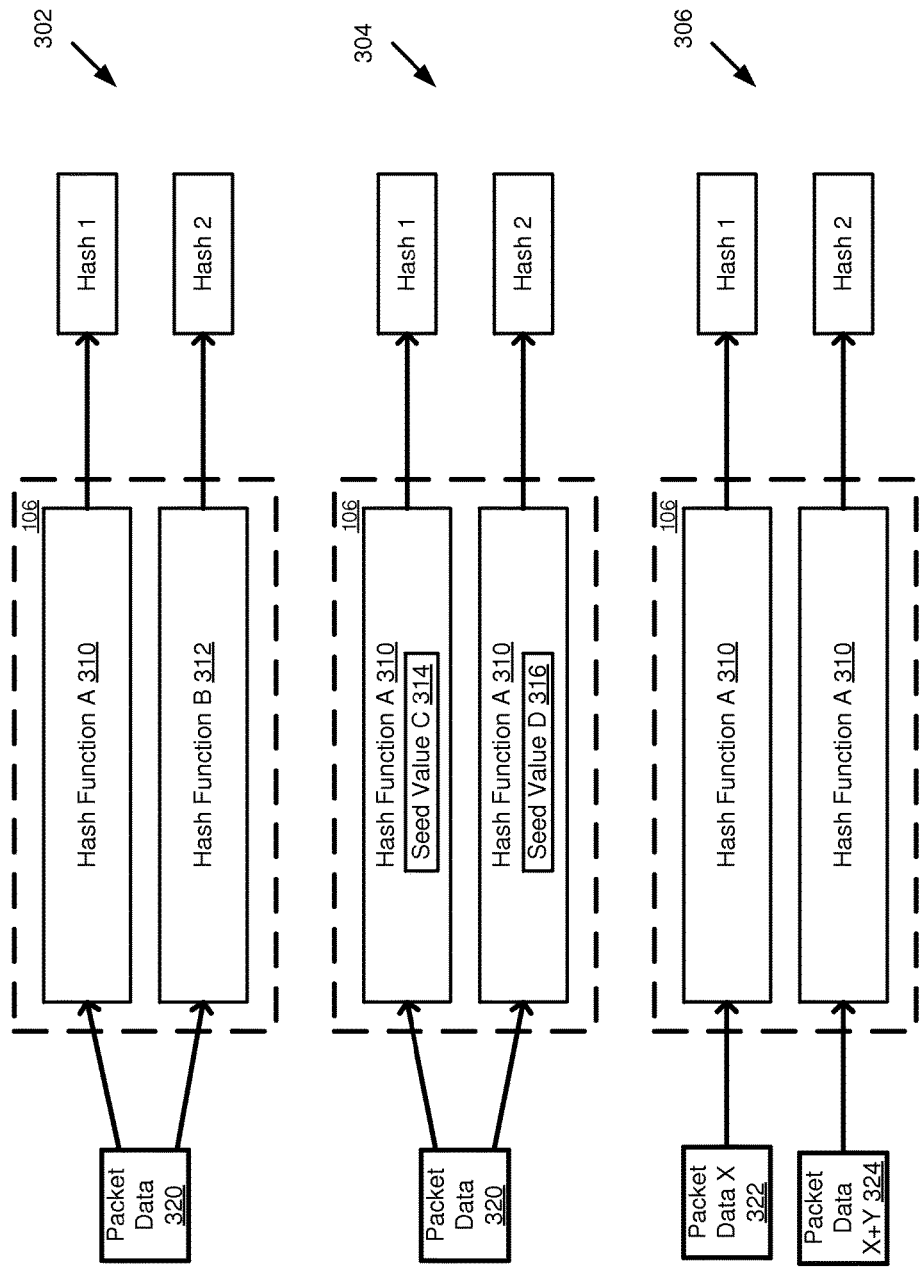
FIG. 3 shows example embodiments of the hash generator of FIG. 1.

FIG. 3 shows example embodiments of the hash generator of FIG. 1. In a first example implementation 302, the hash generator 106 may comprise two different hash functions 310-312, which receive the packet data 320 and generate the two hash values 130-132, respectively.

In a second example implementation 304, the hash generator 106 may comprise two separate implementations of the same hash function 310 but using different initiation values (or seed values) 314 and 316, respectively. Both hash functions 301/314 and 310/316 receive the same packet data and generate the two hash values 130-132, respectively.

In a third example implementation 306, the hash generator 106 may comprise two separate implementations of the same hash function 310. However, the incoming data 322 may be modified to include additional information in order for the hash function 310 to generate a different hash value. For example, the packet data 322 may be modified to include a customer identification to obtain packet data 324 (the customer identification may identify a customer sending the packet data).

Referring again to FIG. 1, the first hash value 130 is used to select a hash bucket from, e.g., a plurality of available hash buckets 116, . . . , 118 in memory 112. The first hash value 130 can be used by the hash bucket address generator 108 to generate a hash bucket address 133. In an example embodiment, the first hash value 130 can be the hash bucket address 133 identifying one of the available hash buckets 116, . . . , 118.

Figure 2:
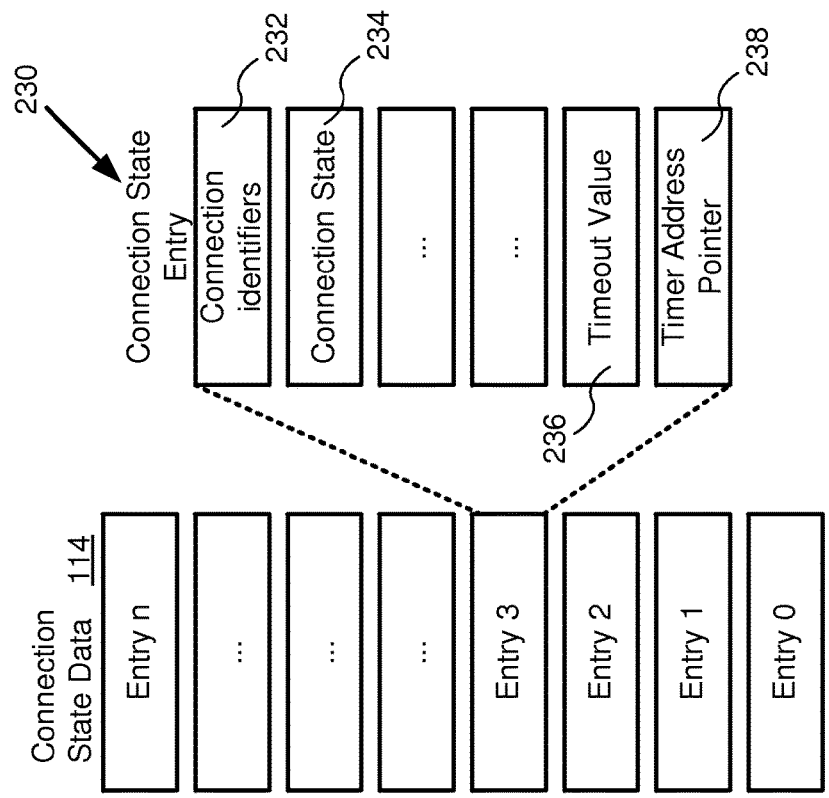
FIG. 2 shows a particular embodiment with further details of the memory structure of FIG. 1.

The hash buckets 116, . . . , 118 are part of the connection state data 114 stored in memory 112. The connection state data 114 can include a plurality of connection state entries (e.g., as illustrated in FIG. 2), and the entries can be organized in a connection state table. The connection state entries can be organized in hash buckets, such as buckets 116, . . . , 118.

FIG. 2 shows particular embodiment with further details of the memory structure of FIG. 1. More specifically, the connection state data 114 can include N connections (where N is any integer number) and each connection is shown as a separate entry. Details of a particular connection state entry are shown at 230 as including multiple fields. A first example field 232 includes a connection identifier, which can identify the network connection using different fields in a packet header, such as a source address, a destination address, a source port, a destination port, and a protocol type (e.g., TCP). Other fields can be used to identify the network connection, as is well understood in the art. Field 234 includes state information associated with the network connection and is based on the last received packet and the type of protocol. The entry 230 also includes a timeout value 236. The timeout value can be considered a primary timeout value as it is the value that is ultimately examined to determine whether a timeout of the network connection occurred. Other fields may also be used within the connection state entry 230. As previously mentioned, the connection state entries 0, . . . , N can be organized in one or more hash buckets 116, . . . , 118.

Figure 4:
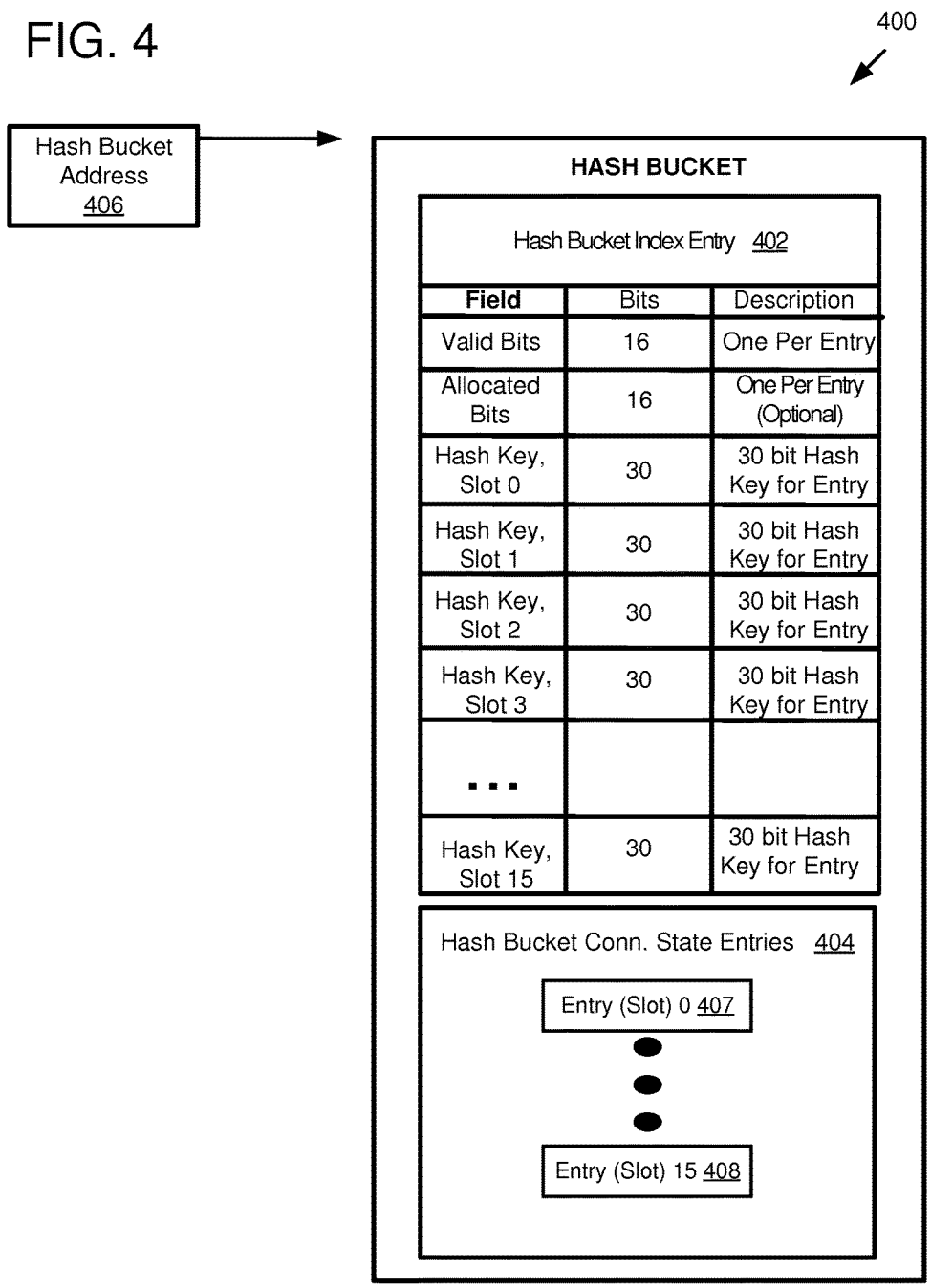
FIG. 4 shows an example implementation of a hash bucket, which can be used in connection with the two-stage connection tracking service of FIG. 1.

FIG. 4 shows an example implementation of a hash bucket 400, which can be used in connection with the two-stage connection tracking service of FIG. 1. Referring to FIG. 4, the hash bucket 400 may be one of the buckets 116, . . . , 118 stored in memory 112 at hash bucket address 406 (i.e., the hash bucket address 406 may point to the beginning of the hash bucket 400).

The hash bucket 400 may comprise a hash bucket index entry 402 and a plurality of hash bucket connection state entries 404 (including entries 407, . . . , 408). In the particular implementation in FIG. 4, the hash bucket index 402 is 64 Bytes long and contains a valid bit field (16 bits; can indicate which of the 16 hash keys are valid), allocated bits (16 bits; can include metadata), and sixteen 30-bit hash keys of corresponding connection state entries 407, . . . , 408. The hash keys in the index 402 may also include an indication of a slot, which can be used to calculate an offset (e.g., from the end of the index) for purposes of determining an address of the corresponding entry. For example, the hash bucket address 406 may be address A, pointing at the beginning of bucket 400 and index 402. Knowing that the index 402 is 64B long, a slot 0 for entry 407 may indicate that there is a zero offset from the end of the index 402 (in other words, entry 407 is located immediately after the 64B index 402. In an example embodiment, the hash bucket index entry 402 can be stored in a table that is separate from the hash bucket 400.

Referring again to FIGS. 1 and 4, the first hash value 130 is used to obtain the hash bucket address 133 (or 406). The hash generator 106 may also generate a second hash value 132, which can be used as an index to identify the connection (e.g., the incoming packet 102) (the processing sequence is indicated with circled reference numbers in FIG. 1). The hash generator 106 may generate (e.g., in parallel) both hash values 130-132 (at reference #2). The second hash value 132 may be communicated to the comparator 110. The hash bucket address 133 generated by the hash bucket address generator 108 (based on the first hash value 130) is used to access the connection state data 114 (at reference #3), and obtain (e.g., read) the entire 64B hash bucket index entry (HBIE) 134 (or 402) (at reference #4). The hash bucket address 133 is also communicated to the address calculation module 111.

The bucket index comparator 110 may then compare the second hash value 132 (which may be a 30-bit value, or a different bit size value) with the hash keys within the index 134 (or 402). The bit value size of the second hash value 132 may be selected so as to minimize the likelihood of a hash collision (e.g., the longer the hash key, the lower the likelihood of a hash collision). After a match is located, the slot of the corresponding hash key entry in the index may be used as an offset 137. The offset 137 is also communicated (at reference #5) to the address calculation module 111, which can calculate (at reference #6) an address 136 of a connection state entry within the hash bucket 400, based on the address 133 and the offset 137. The connection state entry address 136 is communicated (at reference #6) to the memory 112. The connection state entry processing block 120 may fetch (at reference #7) the connection state entry 138 using the address 136. The connection state entry processing module 120 may compare the retrieved connection state entry 138 with connection state associated with the incoming packet data 102 to either accept the data packet (at reference #8) or reject the data packet (at reference #9). If the data packet is accepted, an updated connection state may be stored back at entry address 136 in the hash bucket 400. If the data packet is rejected, the packet is dropped.

In this regard, using a fixed sized hash bucket and a two-stage hash scheme as explained herein, minimizes and fixes the number of sequential memory accesses required to fetch a connection state entry. More specifically, exactly two memory accesses are required for each entry fetch—one to access the hash bucket index, and one (or more) to fetch the correct entry. In instances when multiple index entries match (e.g., during the matching done by comparator 110), all matching entries will be fetched. Using a different initial value for the second hash reduces the probability that multiple entries in the same bucket have the same index.

Figure 5:
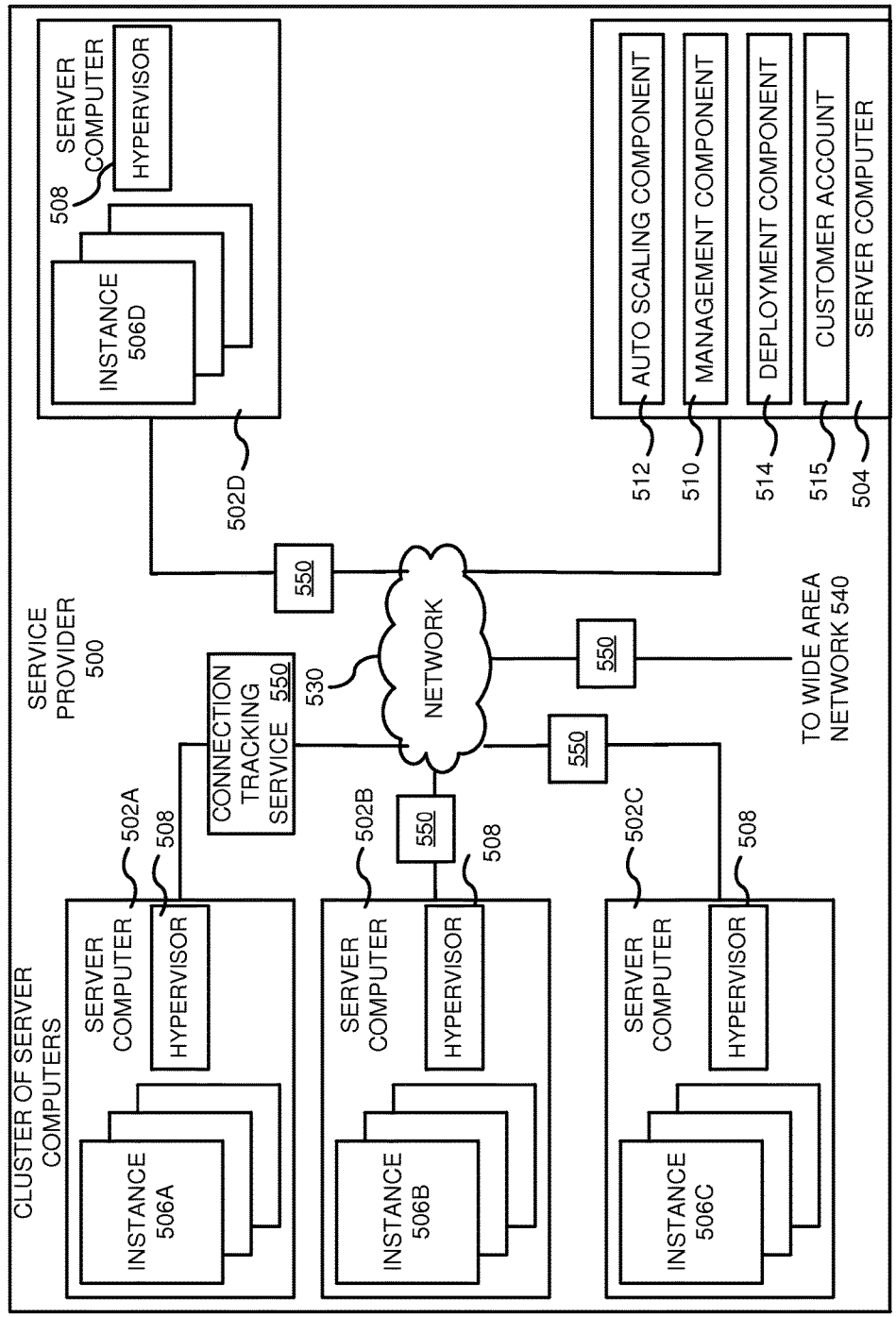
FIG. 5 is an example system diagram showing a plurality of virtual machine instances running in a service provider environment, which includes the forecast reconciliation service.

FIG. 5 is an example system diagram showing a plurality of virtual machine instances running in a service provider environment 500, which includes the forecast reconciliation service. By way of background, the service provider 500 (i.e., the cloud provider) is capable of delivery of computing and storage capacity as a service to a community of end recipients. In an example embodiment, the service provider can be established for an organization by or on behalf of the organization. That is, the service provider 500 may offer a "private cloud environment." In another embodiment, the service provider 500 supports a multi-tenant environment, where a plurality of customers may operate independently (i.e., a public cloud environment). Generally speaking, the service provider 500 can provide the following models: Infrastructure as a Service ("IaaS"), Platform as a Service ("PaaS"), and/or Software as a Service ("SaaS"). Other models can be provided. For the IaaS model, the service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 500 using networked client devices, such as desktop computers, laptops, tablets, smartphones, etc. running web browsers or other lightweight client applications. Those skilled in the art will recognize that the service provider 500 can be described as a "cloud" environment.

In an example embodiment, the service provider 500 is a distributed service provider, which can include on-premises provider and/or cloud services provider.

The particular illustrated service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can include the Internet and/or a local area network (LAN), and can be connected to a Wide Area Network (WAN) 540 so that end users can access the service provider 500. It should be appreciated that the network topology illustrated in FIG. 5 has been simplified and that many more networks and networking devices can be utilized to interconnect the various computing systems disclosed herein.

A connection tracking service 550 can be coupled between each of the server computers (502A-502D) and the network 530 in the service provider 500. The connection tracking service 550 can also be coupled between the network 530 and the wide area network 540. The connection tracking service 550 can have functionalities that are similar to the CTS 104 in FIG. 1. More specifically, the CTS 550 may be used to track connection status between one or more connection between instances 506 running on the server computers 502. In some embodiments, the CTS 550 can be provided as a paid service to customers of the service provider 500 (e.g., so that a customer may track connection status between instances that the customer owns and/or connection status between customer instances and one or more other users (e.g., clients of the customer)).

Figure 6:
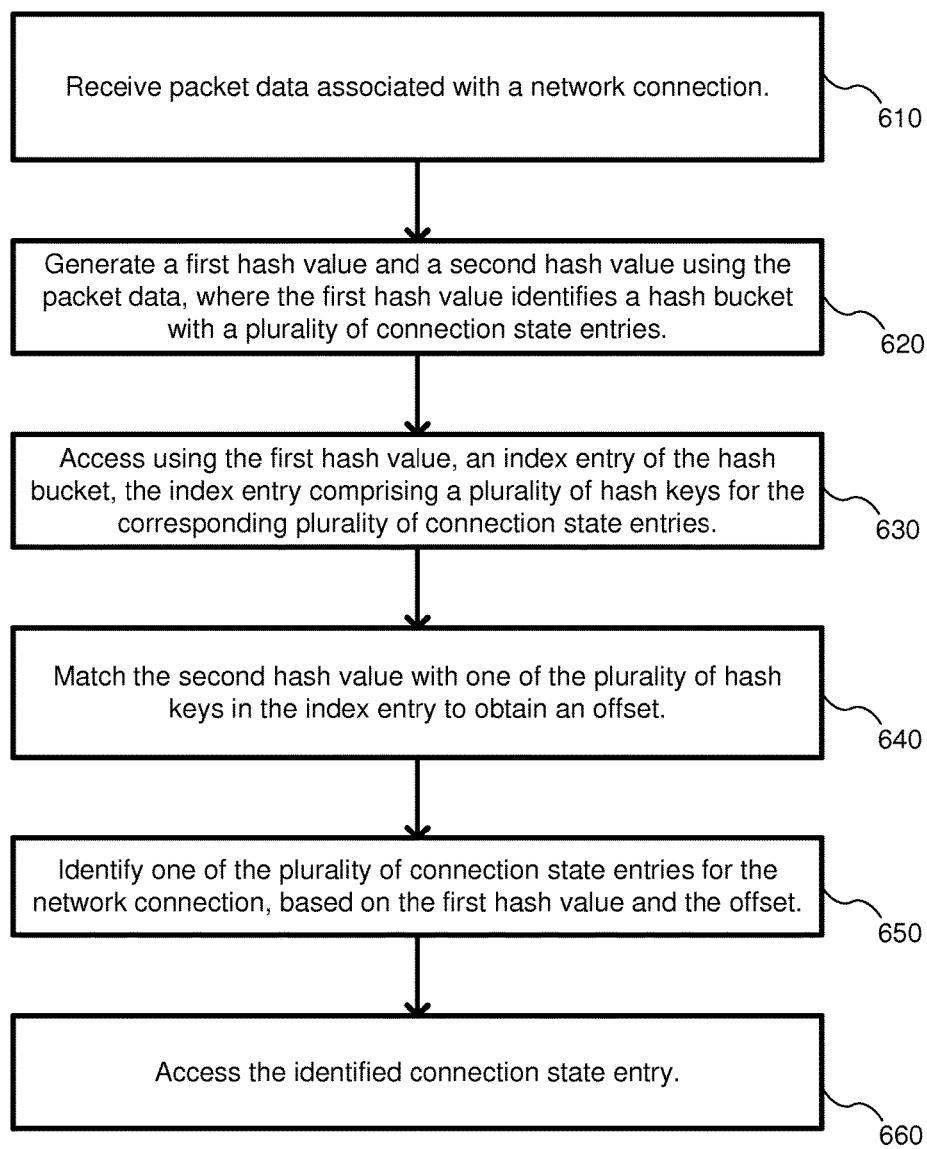
FIG. 6 is a flowchart of an example method for accessing a memory location according to an embodiment of the disclosed technologies.

FIG. 6 is a flowchart of an example method for accessing a memory location according to an embodiment of the disclosed technologies. Referring to FIG. 6, the illustrated example method may start at 610, when packet data associated with a network connection may be received. For example, the hash generator 106 within the connection tracking service 104 may receive packet data 102. The packet data 102 may include one or more of a source IP address, a destination IP address, a source port number, a destination port number, a protocol identifier, and a customer identification.

At 620, a first hash value and a second hash value are generated using the packet data. For example, the hash generator 106 generates two different hash values 130-132 in parallel. The first hash value 130 may identify a hash bucket (e.g., 400) with a plurality of connection state entries (e.g., 404). The first hash value 130 may identify the hash bucket address 406 indicating where the hash bucket 400 is stored in the memory location 112.

At 630, an index entry of the hash bucket may be accessed using the first hash value. For example, the hash bucket address 133 (or 406) can be obtained based on the first hash value 130. The index entry 134 (or 402) may be obtained from the memory 112 using the address (or the first hash value 130). As seen in FIG. 4, the index entry 402 may include a plurality of hash keys (and slot numbers) for the corresponding plurality of connection state entries (e.g., 404).

At 640, the second hash value is matched with one of the plurality of hash keys in the index entry to obtain an offset. For example, the bucket index comparator 110 may read the hash bucket index entry identified using the first hash value 130, and then may compare the second hash value 132 (which may be a 30-bit value) with the hash keys within the index 134 (or 402). The slot number of the matched hash key may be used to obtain an offset (e.g., from the hash bucket address) so that the corresponding connection state entry is located in the memory 112.

At 650, one of the plurality of connection state entries for the network connection may be identified, based on the first hash value and the offset. For example, after a match is located, the slot of the corresponding hash key entry in the index may be used as an offset to calculate an address 136 of a connection state entry within the hash bucket 400. At 660, the identified connection state entry may be accessed (e.g., by the connection state entry verification module 120 for purposes of validating the incoming data packet 102).

Figure 7:
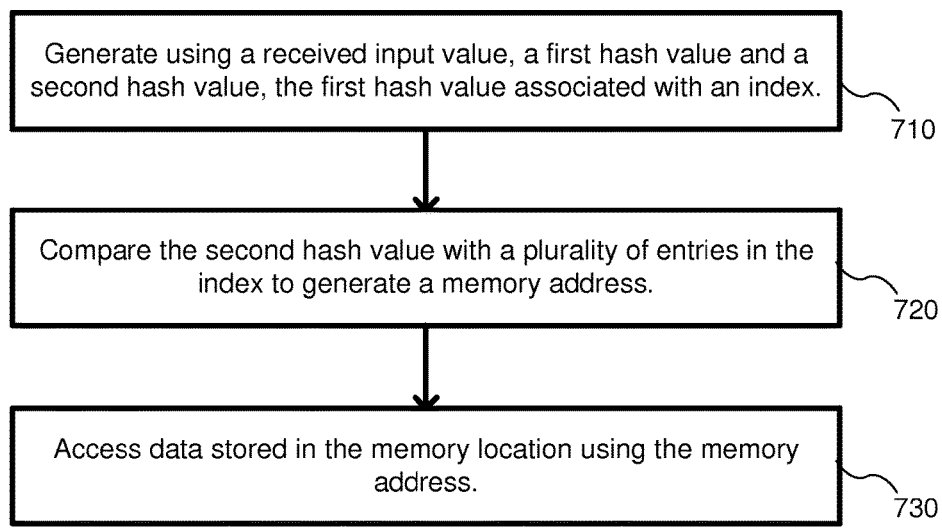
FIG. 7 is a flowchart of another example method for accessing a memory location according to an embodiment of the disclosed technologies.

FIG. 7 is a flowchart of another example method for accessing a memory location according to an embodiment of the disclosed technologies. Referring to FIGS. 1 and 7, the illustrated example method may start at 710, when, a first hash value and a second hash value are generated using a received input value. For example, the received input value may be packet data 102, which may include one or more of a source IP address, a destination IP address, a source port number, a destination port number, a protocol identifier, and a customer identification. The hash generator 106 generates two different hash values 130-132 in parallel. The first hash value 130 may identify a hash bucket (e.g., 400) with a plurality of connection state entries (e.g., 404). The first hash value 130 may identify the hash bucket address 406 indicating where the hash bucket 400 is stored at the memory location 112. In this regard, the first hash value is associated with an index (e.g., 402), which can be part of the hash bucket (e.g., 400).

At 720, the second hash value can be compared with a plurality of entries in the index to generate a memory address. For example, the hash bucket address 133 (or 406) can be obtained based on the first hash value 130. The index entry 134 (or 402) may be obtained from the memory 112 using the address (or the first hash value 130). The index entry 402 may include a plurality of hash keys (and slot numbers) for the corresponding plurality of connection state entries (e.g., 404). The bucket index comparator 110 may read the hash bucket index entry identified using the first hash value 130, and then may compare the second hash value 132 (which may be a 30-bit value) with the hash keys within the index 134 (or 402). The slot number of the matched hash key may be used to obtain an offset (e.g., from the hash bucket address) so that the corresponding connection state entry is located in the memory 112.

At 730, data stored in the memory location may be accessed using the memory address. For example, the connection state entry verification module 120 may access the connection state entry 138 for purposes of validating the incoming data packet 102.

Figure 8:
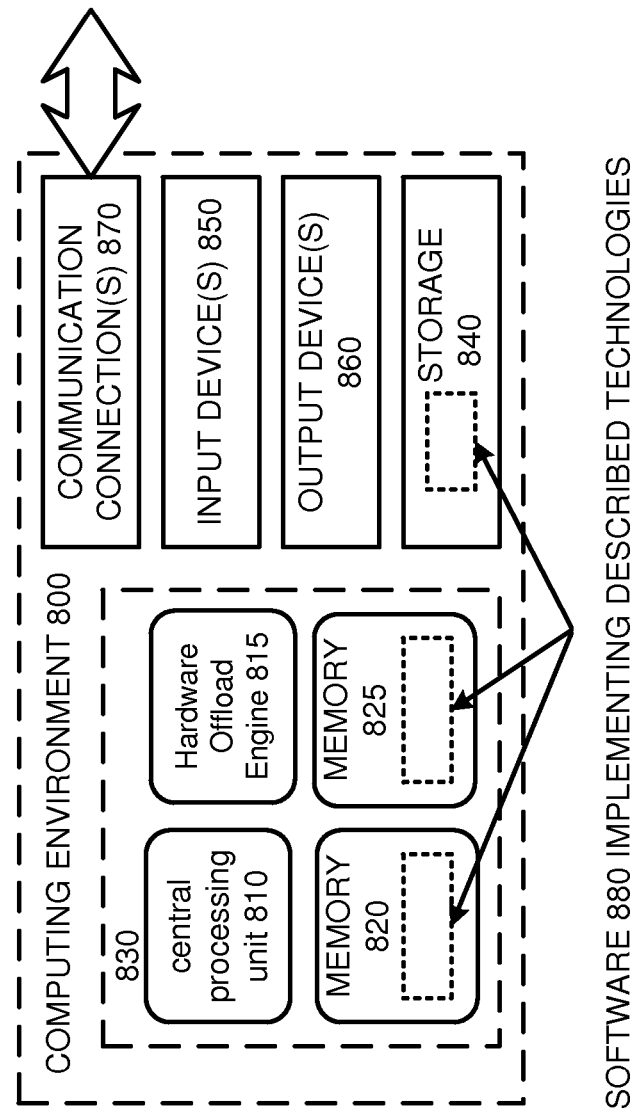
FIG. 8 depicts a generalized example of a suitable computing environment in which the described innovations may be implemented.

FIG. 8 depicts a generalized example of a suitable computing environment 800, in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., NIC, desktop computer, laptop computer, server computer, tablet computer, etc.).

With reference to FIG. 8, the computing environment 800 includes one or more processing units 810, memory 820, 825, and a hardware offload engine 815. In FIG. 8, this basic configuration 830 is included within a dashed line. The processing units 810 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. The hardware offload engine 815 can include hardware logic shown (outside of memory 112) in FIG. 1 (e.g., one or more hardware modules associated with the connection tracking service 104). For example, the hardware offload engine 815 can include the hash generator 106, the generator 108, and the comparator 110. Other hardware components can be used within the offload engine 815 as well. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 can include the memory components from memory 112. The memory 820, 825 can also store software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed completely or in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technologies may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for accessing a memory location of a non-transitory, computer-readable storage medium, the method comprising:
    receiving packet data associated with a network connection;
    generating a first hash value and a second hash value using the packet data, wherein the first hash value identifies a hash bucket with a plurality of connection state entries and having a predetermined, fixed bucket size;

accessing, using the first hash value, an index entry of the hash bucket, the index entry comprising a plurality of hash keys for the corresponding plurality of connection state entries;

based on the index entry of the hash bucket accessed using the first hash value, matching the second hash value with one of the plurality of hash keys in the index entry to obtain an offset;

identifying one of the plurality of connection state entries for the network connection, based at least in part on the hash bucket selected using the first hash value, and the offset;

accessing the identified connection state entry;

processing the connection state entry; and accepting or rejecting the packet data depending on an outcome from processing the connection state entry.

2. The method according to claim 1, wherein the identifying comprises:

generating a memory address based at least in part on the first hash value combined with the offset.

3. The method according to claim 2, further comprising:

accessing the identified connection state entry based on the generated memory address.

4. The method according to claim 1, wherein the first hash value and the second hash value are generated in parallel, the first hash value being different than the second hash value.

5. The method according to claim 1, wherein the hash bucket comprises the index entry.

6. The method according to claim 1, wherein the first hash value and the second hash value are generated based on one or more of the following: a source IP address, a destination IP address, a source port number, a destination port number, or a protocol identifier within the received packet data.

7. A method for accessing a memory location of a non-transitory, computer-readable storage medium, the method comprising:

generating, using a received input value, a first hash value and a second hash value, the first hash value associated with an index pointing to a data object storing connection data and having a predetermined, fixed size;

based on the index associated with the first hash value, comparing the second hash value with a plurality of entries in the index to identify a memory address;

accessing data stored in the memory location using the memory address;

processing the data stored in memory location; and performing an action on the received input value depending on an outcome from processing the data.

8. The method according to claim 7, further comprising:

generating the first hash value using a first hash function; and generating the second hash value using a second hash function, wherein the first hash function is different from the second hash function, and the first hash value and the second hash value are generated in parallel with each other.

9. The method according to claim 7, wherein the first hash value identifies a hash bucket with a plurality of connection state entries, wherein the hash bucket comprises the index.

10. The method according to claim 9, wherein the index comprises a plurality of hash keys and a plurality of offsets for the corresponding plurality of connection state entries.

11. The method according to claim 10, wherein the comparing further comprises:

comparing the second hash value with one of the plurality of hash keys in the index entry to obtain a matching hash key from the index.

12. The method according to claim 11, further comprising:

obtain an offset from the plurality of offsets, wherein the offset corresponds to the matching hash key.

13. The method according to claim 12, wherein the first hash value is used to determine an address of the hash bucket in the memory location, and the method further comprises:

appending the offset to the address of the hash bucket to obtain an entry address.

14. The method according to claim 13, wherein accessing the data further comprises:

accessing one of the plurality of connection state entries using the obtained entry address.

15. The method according to claim 7, wherein the input data is network packet data comprising one or more of the following: a source IP address, a destination IP address, a source port number, a destination port number, a protocol identifier, or a customer identification.

16. A system for accessing a memory location of a non-transitory, computer-readable storage medium, the system comprising:

a hash generator, the hash generator operable to:
receive packet data associated with a network connection; and
generate a first hash value and a second hash value using the packet data, wherein the first hash value identifies a hash bucket with a plurality of connection state entries and having a predetermined, fixed bucket size, the hash bucket comprising an index entry with a plurality of hash keys for the plurality of connection state entries;

a memory storage area storing the hash bucket;

a comparator operable to match the second hash value with one of the plurality of hash keys in the index entry based on the hash bucket identified by the first hash value to obtain an offset;

a connection state entry processor operable to access one of the plurality of connection state entries for the at least one network connection, based on the first hash value and the offset, perform a data processing operation on one of the plurality of connection state entries, and accept or reject the packet data based on a result of the data processing operation.

17. The system according to claim 16, wherein the connection state entry processor is further operable to:

verify the received packet data based on the accessed one of the plurality of connection state entries; and upon successful verification of the received packet data, update the accessed one of the plurality of connection state entries based on the received packet data; and store the updated one of the plurality of connection state entries in the hash bucket.

18. The system according to claim 16, wherein the hash generator is further operable to generate the first and second hash values in parallel, using two different hash functions.

19. The system according to claim 16, wherein the memory storage area stores a connection state table with the plurality of connection state entries, the connection state table sized to a capacity of all potential network connections, whether the network connections are active or not.

20. The system according to claim 16, wherein the system is an input/output (IO) device including a network interface card, an offload engine, or both.

* * * * *